United States Patent
Bogrett

(10) Patent No.: US 9,898,501 B2
(45) Date of Patent: Feb. 20, 2018

(54) METHOD AND SYSTEM FOR PERFORMING TRANSACTIONAL UPDATES IN A KEY-VALUE STORE

(71) Applicant: NEUSTAR, INC., McLean, VA (US)

(72) Inventor: Steven Bogrett, Los Gatos, CA (US)

(73) Assignee: NEUSTAR, INC., MacLean, VA (US)

( * ) Notice: Subject to any disclaimer, the term of this patent is extended or adjusted under 35 U.S.C. 154(b) by 301 days.

(21) Appl. No.: 14/025,157

(22) Filed: Sep. 12, 2013

(65) Prior Publication Data

US 2015/0074071 A1  Mar. 12, 2015

(51) Int. Cl.
*G06F 17/30* (2006.01)

(52) U.S. Cl.
CPC .. *G06F 17/30377* (2013.01); *G06F 17/30011* (2013.01); *G06F 17/30067* (2013.01); *G06F 17/30575* (2013.01)

(58) Field of Classification Search
CPC ........ G06F 17/30011; G06F 17/30575; G06F 17/30067
USPC ........ 707/826, 615, 703, 759, 648; 715/513; 709/201
See application file for complete search history.

(56) References Cited

U.S. PATENT DOCUMENTS

| | | | | |
|---|---|---|---|---|
| 5,991,771 A | * | 11/1999 | Falls | G06F 9/466 |
| 6,526,417 B1 | * | 2/2003 | Perry | G06F 17/30368 |
| 7,076,508 B2 | * | 7/2006 | Bourbonnais | G06F 17/30377 |
| 7,474,933 B2 | * | 1/2009 | Annamaneni | G01R 31/31707 700/100 |
| 7,650,331 B1 | * | 1/2010 | Dean | G06F 9/5066 712/203 |
| 7,650,460 B2 | * | 1/2010 | Cheriton | G06F 12/0223 365/49.1 |
| 7,756,598 B2 | * | 7/2010 | Annamaneni | G01R 31/31707 700/100 |
| 7,756,919 B1 | * | 7/2010 | Dean | G06F 17/30445 709/201 |
| 8,121,980 B2 | * | 2/2012 | Reid et al. | 707/648 |
| 8,655,923 B2 | * | 2/2014 | Zurek | G06F 17/30489 707/694 |
| 9,047,334 B1 | * | 6/2015 | Cheriton | G06F 17/30371 |
| 2003/0120760 A1 | * | 6/2003 | Fortin | H04L 41/0213 709/221 |
| 2004/0060006 A1 | * | 3/2004 | Lindblad et al. | 715/513 |
| 2004/0088298 A1 | * | 5/2004 | Zou | G06F 17/30575 |

(Continued)

FOREIGN PATENT DOCUMENTS

WO   WO 2013041852 A2 * 3/2013

OTHER PUBLICATIONS

Bryan Thompson, Bigdata Database Architecture, the bigdata® RDF database, Feb. 28, 2013, pp. 1-34.*

(Continued)

*Primary Examiner* — Frantz Coby

(74) *Attorney, Agent, or Firm* — Mahamedi IP Law LLP

(57) ABSTRACT

A method and system for performing a transactional update of a plurality of values in a key-value store that includes a first writer starting a transaction, a second writer joining the transaction, the first writer and the second writer writing changes to the plurality of values in a temporary transaction area in a storage area, and after the first writer and the second writer complete writing the changes, moving the plurality of values from the temporary transaction area to a global area in the key-value store.

21 Claims, 23 Drawing Sheets

(56) References Cited

U.S. PATENT DOCUMENTS

| | | | |
|---|---|---|---|
| 2005/0050004 A1* | 3/2005 | Sheu .................. | H04L 9/083 |
| 2005/0289189 A1* | 12/2005 | Nettleton .......... | G06F 17/30578 |
| 2006/0218206 A1* | 9/2006 | Bourbonnais ..... | G06F 17/30377 |
| 2010/0235587 A1* | 9/2010 | Noel .................. | G06F 9/466 |
| | | | 711/147 |
| 2013/0132335 A1* | 5/2013 | Yang ................. | G06F 17/30345 |
| | | | 707/609 |
| 2013/0145349 A1* | 6/2013 | Basak ................ | G06F 9/44505 |
| | | | 717/121 |
| 2013/0227101 A1* | 8/2013 | Stevens ............. | G06F 9/46 |
| | | | 709/223 |
| 2014/0156618 A1* | 6/2014 | Castellano .................. | 707/703 |
| 2014/0172898 A1* | 6/2014 | Aguilera et al. ............. | 707/759 |
| 2014/0330767 A1* | 11/2014 | Fowler ......................... | 707/607 |
| 2015/0058306 A1* | 2/2015 | Earl .................... | H04L 67/1097 |
| | | | 707/703 |
| 2015/0081623 A1* | 3/2015 | Promhouse ........... | G06F 9/466 |
| | | | 707/607 |

OTHER PUBLICATIONS

Sovran et al., Transactional Storage for Geo-Replicated Systems, Microsoft Research, 2008.*
Authors et al., Synchronization of Global File Tracing, in Jave-Based Applications, IBM, Sep. 13, 2005, pp. 1-16.*
Ranganathan et al., Workloads on Shared Memory Systems with Out-of-Order Processors, Western Research Laboratory, pp. 1-14.*
Oracle Architecture, Collection of Oracle Artifacts, Apr. 11, 2012, pp. 1-7.*

* cited by examiner

METHOD AND SYSTEM FOR PERFORMING TRANSACTIONAL UPDATES IN A KEY-VALUE STORE

BACKGROUND

Field

The present disclosure relates generally to key-value stores, and in particular to transactional updates in key-value stores.

Description of the Related Art

Key-value stores may be used to store large quantities of data. In a key-value store, a key may map to multiple values. Apache Cassandra is an example of a related art implementation of a key-value store.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
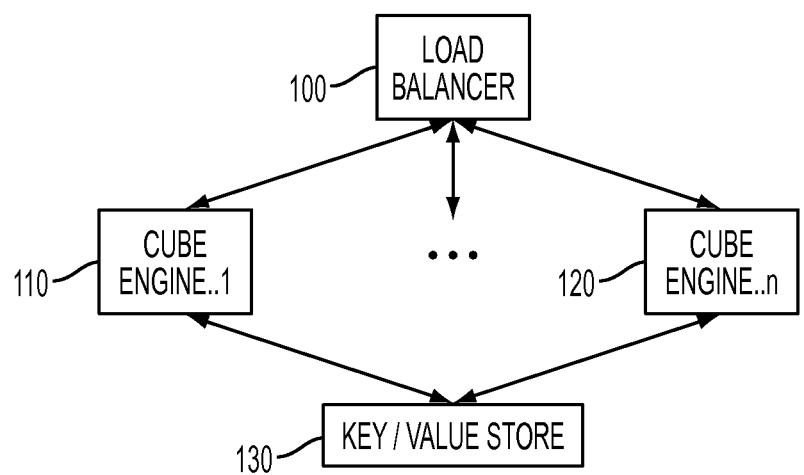
FIG. 1 is a block diagram that illustrates a system for performing query processing and transactional updates in a key-value store, according to an embodiment.

FIG. 1 illustrates a system for performing query processing and transactional updates in a key-value store, according to an embodiment. The system may include a load balancer 100 that balances a processing load between n cube engines, including cube engine 1 110 through cube engine n 120. Each of the cube engines, including cube engine 1 110 through cube engine n 120, communicates with a key-value store 130. The system is horizontally scalable; nodes may be added to increase performance, capacity, and throughput, and the number of cubes and size of each cube may only be limited by the cluster disk.

Figure 2:
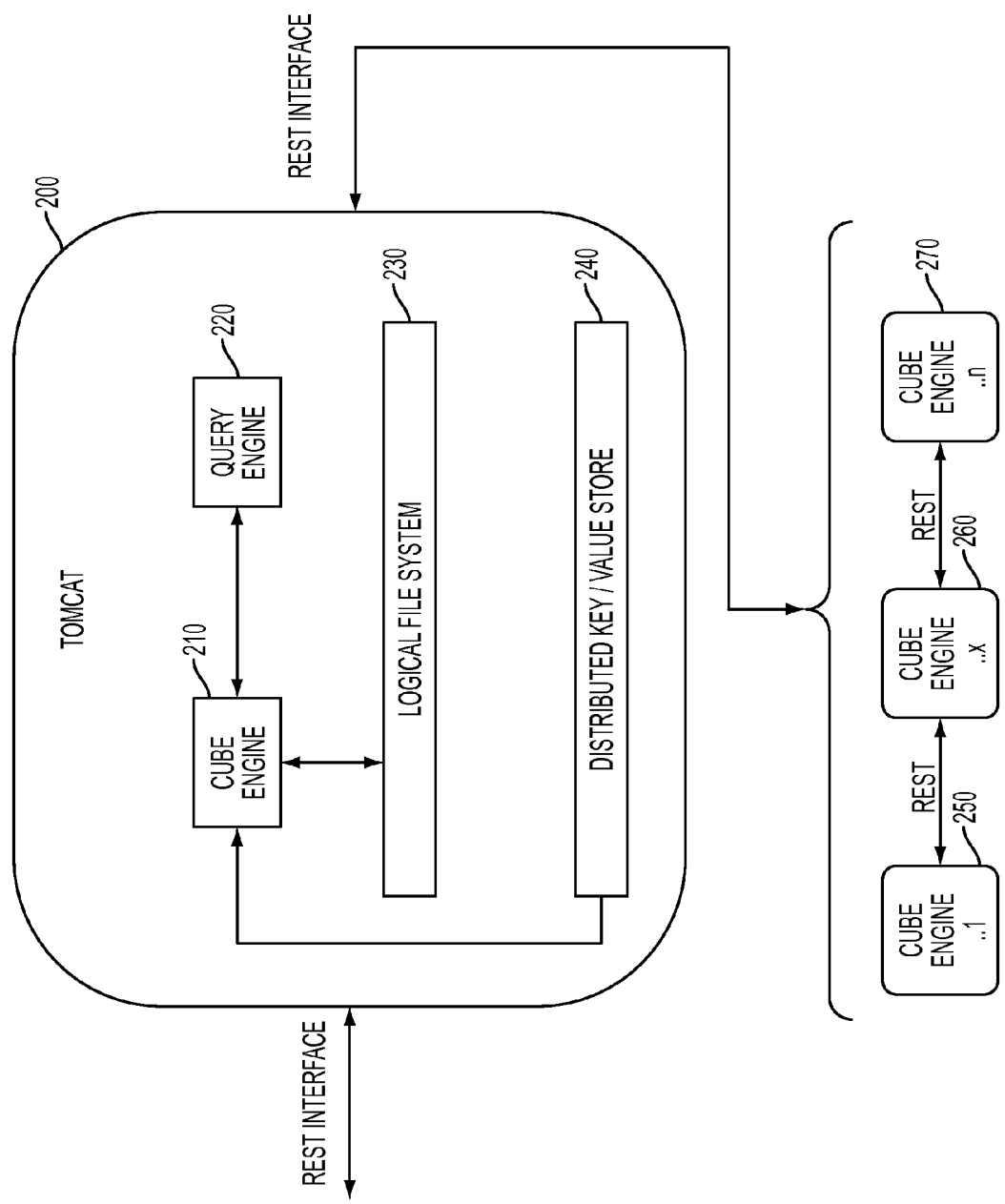
FIG. 2 is a block diagram that illustrates a server running a cube engine, according to an embodiment.

FIG. 2 illustrates a server running a cube engine 210, according to an embodiment. The cube engine 210, a query engine 220, a logical file system 230, and a distributed key-value store 240 may run on a server, web server, or servlet container 200 such as Apache Tomcat. The cube engine 210 may communicate with the query engine 220, the logical file system 230, and the distributed key-value store 240. The cube engine 210 may communicate with other cube engines including cube engine 1 250, cube engine x 260, and cube engine n 270 through a representations state transfer (REST) interface. Specifically, for load balancing, the cube engine 210 may send REST requests (queries) to the other cube engines including cube engine 1 250, cube engine x 260, and cube engine n 270. The cube engine 210 may receive REST responses (query slices) from the other cube engines including cube engine 1 250, cube engine x 260, and cube engine n 270.

Figure 3:
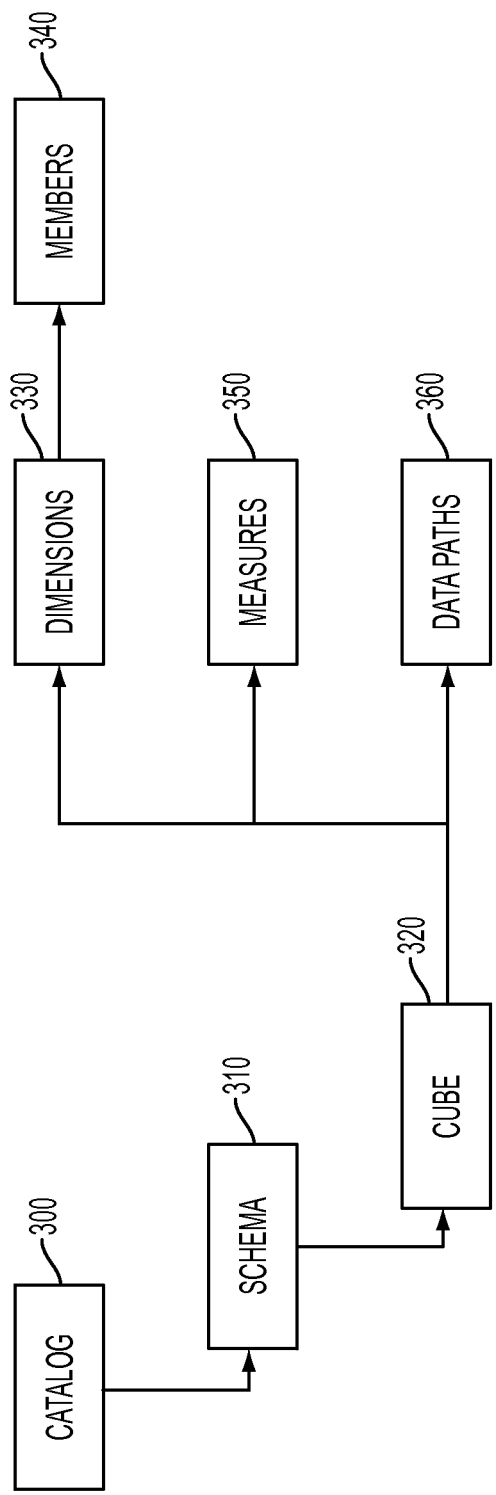
FIG. 3 is a block diagram that illustrates a logical taxonomy of a cube engine, according to an embodiment.

FIG. 3 illustrates a logical taxonomy of a cube engine, according to an embodiment. The top level of the logical taxonomy is a catalog 300. The catalog 300 may contain a schema 310. The schema 310 may contain a cube 320. The cube 320 may have dimensions 330, measures 350, and data paths 360. The dimensions 330 may have members 340.

Figure 4:
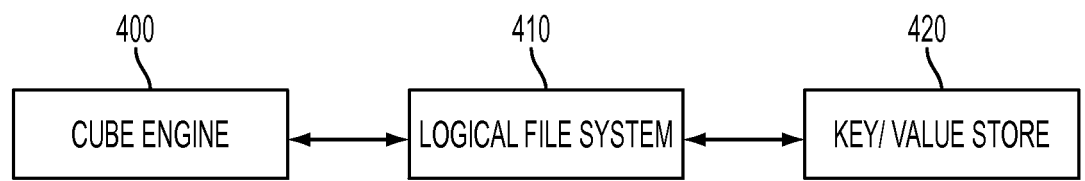
FIG. 4 is a block diagram that illustrates relationships between a logical file system, a cube engine, and a key-value store, according to an embodiment.

FIG. 4 illustrates relationships between a logical file system 410, a cube engine 400, and a key-value store 420, according to an embodiment. The logical file system 410 is in communication with the cube engine 400 and the key-value store 420. The logical file system 410 may provide a hierarchical interface to the key-value store 420. The logical file system 410 may include concepts such as directories, paths, and objects. The logical file system 410 may be implemented by a Java library.

The logical file system 410 may provide a hierarchy that can be traversed using iterators and/or lists. Single objects may be randomly read in the logical file system 410. Each file in the logical file system 410 may be an opaque object, and a pluggable key-value store interface may be provided. The logical file system 410 may be aware that it can be distributed and may have the concept of "read for write" which parallels a CAS. The logical file system 410 may use "hidden" keys that store metadata in custom, fast serializing objects.

The cube engine 400 may use the logical file system 410 and may implement the following hierarchy as a way to store its information:

```
/
Sub-directories are all catalog names
/<catalog>
Sub-directories are all schema names
/<catalog>/<schema>
Sub-directories are all cube names
/<catalog>/<schema>/<cube>/cube.xml
Definition of the cube
/<catalog>/<schema>/<cube>/blocks
Directory tree containing all data blocks for this cube
/<catalog>/<schema>/<cube>/blocks/<datapath>
Directory tree containing all data blocks belonging to a specific data path
/<catalog>/<schema>/<cube>/blocks/<datapath>/<measure>
Directory tree containing all data blocks for a specific data path and measure name
/<catalog>/<schema>/<cube>/blocks/<datapath>/<measure>/<memberx>/<membery>/#
A block file numbered from 1 - n containing data for that cube / datapath / measure and corresponding dimensional members
```

Figure 5:
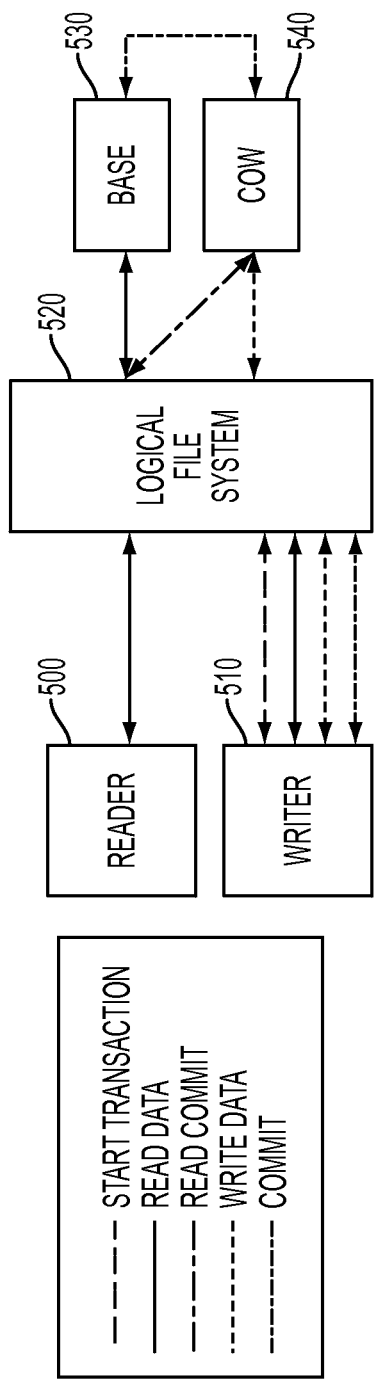
FIG. 5 is a block diagram that illustrates transactional consistency in a system for performing transactional updates, according to an embodiment.

FIG. 5 illustrates transactional consistency in a system for performing transactional updates, according to an embodiment. A reader 500 and a writer 510 may be provided that communicate with a logical file system 520. A BASE key 530 and a copy on write (COW) key 540 may store copies of data (i.e., values).

The system may perform a single write transaction at a time or may perform multiple write transactions at a time with corresponding multiple copies of the data (COW). When multiple write transactions modify the same data, it is up to the writers to merge (COW) data and handle concurrent writes which change the same value. The writer can either merge the data or rollback one of the write transactions by simply discarding the (COW) data. Two copies of the data (value) may be stored: one copy with the BASE key 530 and one copy with the COW key 540. Reading may be performed using the value stored at the BASE key 530, and reading/writing may be performed using the value stored at the COW key 540. The BASE key 530 may store global data including transactions and transaction state. The COW key 540 may store temporary transaction data.

During a read transaction, values are read from BASE key 530, unless the global transaction state is set to a commit state, in which case an attempt to read values from the COW key 540 is made first, and then if the values are not present in the COW key 540, the values are ready from the BASE key 530.

During an update transaction (i.e., the global transaction state is set to the commit state), values are read from the COW key 540 and written to the BASE key 530, and then the values are deleted from the COW key 540.

The system thus provides for reads that may run at full speed, and locking is only performed on COW data. Additionally, a write transaction may be distributed and is very fault tolerant.

Figure 6:
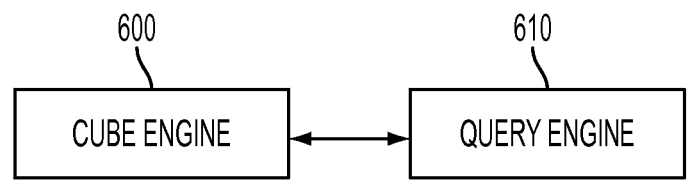
FIG. 6 is a block diagram that illustrates a cube engine and a query engine, according to an embodiment.

FIG. 6 illustrates a cube engine 600 and a query engine 610, according to an embodiment. The cube engine 600 communicates with the query engine 610. Data may be fed into the cube engine 600 through interfaces of the query engine 610. The cube engine 600 may pull data from the interfaces of the query engine 610. Multiple cube engine instances may update the same cube concurrently because both the cube engine 600 and the logical file system are aware they can be distributed. The cube engine 600 may be used within Java map/reduce frameworks.

The cube engine 600 may be a library that uses library interfaces of the query engine 610. The cube engine 600 and the query engine 610 do not make assumptions about the locality of data; data may be pulled from almost any data source at any time. The cube engine 600 may use the logical file system concepts of distributed writes, read for write, and merging for updates. The query engine 610 may be used for parsing and execution of cube engine 600 functions.

Figure 7:
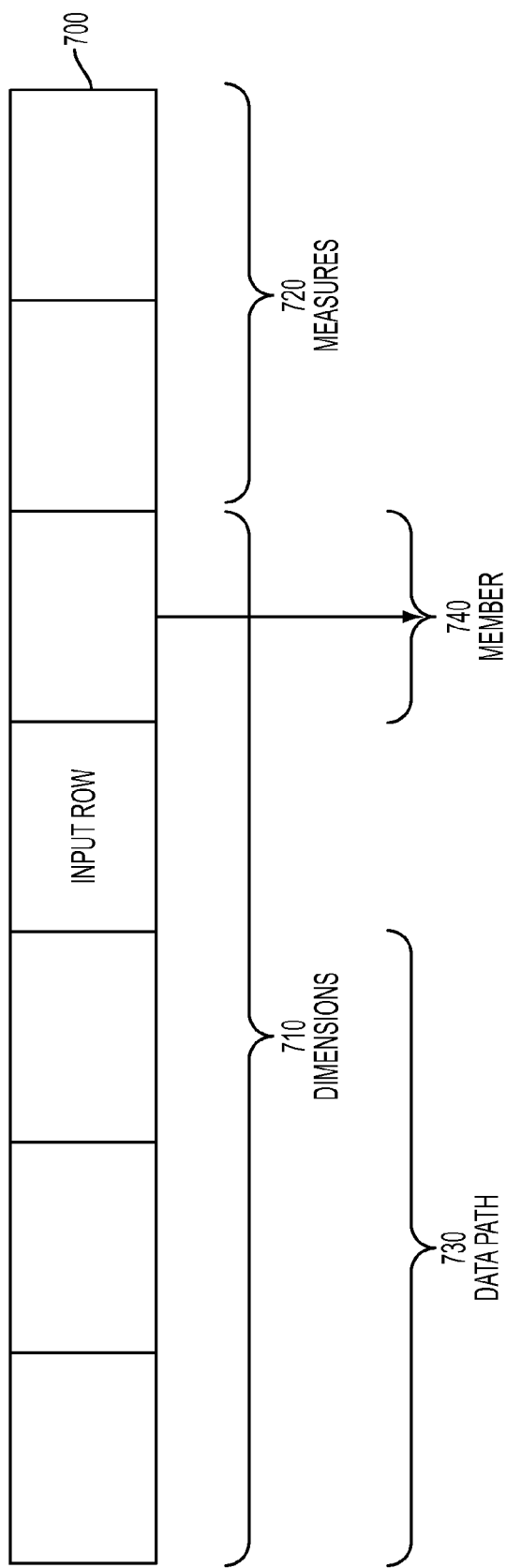
FIG. 7 is a block diagram that illustrates input record mapping, according to an embodiment.

FIG. 7 illustrates input record mapping, according to an embodiment. Rows such as input row 700 may be grouped together before being input into the cube engine, but such grouping is not required. Data values from the input row 700 may feed many pieces of the cube. For example, input row 700 may include dimensions 710, measures 720, and member 740. Input records may be distributed to any node of the cube cluster.

Figure 8:
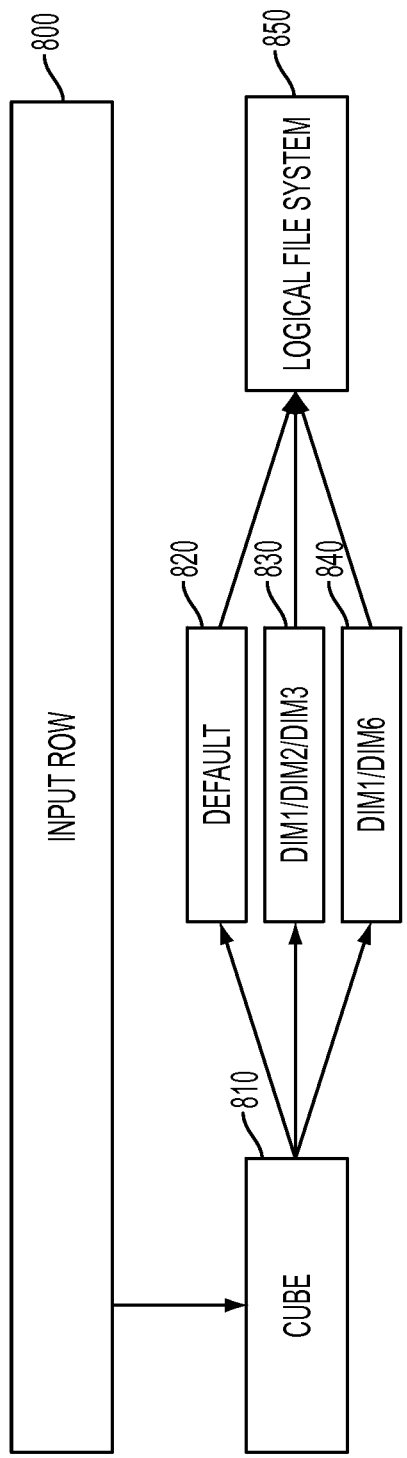
FIG. 8 is a block diagram that illustrates data paths, according to an embodiment.

FIG. 8 illustrates data paths, according to an embodiment. Data paths are alternate access paths to redundant/summarized data created during an update. For example, input row 800 may be fed into cube 810. Data values in the cube 810 may be accessed using data paths 820, 830, and 840 which are directories in a logical file system 850. Data paths such as data path 820 may be used to access a replication or a summarization of the default data. Data paths 820, 830, and 840 may be defined when the cube 810 is created. When the cube 810 is updated, such as when input row 800 is fed into cube 810, each of the data paths 820, 830, and 840 is updated.

Data blocks may also be provided. Data blocks are directly related to data paths 820, 830, and 840 and measures as defined in the cube 810. Data blocks may be either raw data measures or summarized measures. Data blocks may be merged with other data blocks. Data blocks may be stored in the logical file system 850 as a single numbered file and are able to be self-serialized and deserialized. Each data block object may have a data type. Data coercion from Java standard intrinsic types may be minimized, and data may be stored as intrinsic types or arrays of intrinsics and not objects. Each data block object may have a summarization of itself (e.g., Counts/Min/Max/Sum/SumOfSquares/NullCount) and a description of where it should sit in the directory hierarchy for purposes of repair and distribution of recalculations. Data blocks do not require compression but are usually compressible and may be tightly packed with intrinsic values.

Figure 9:
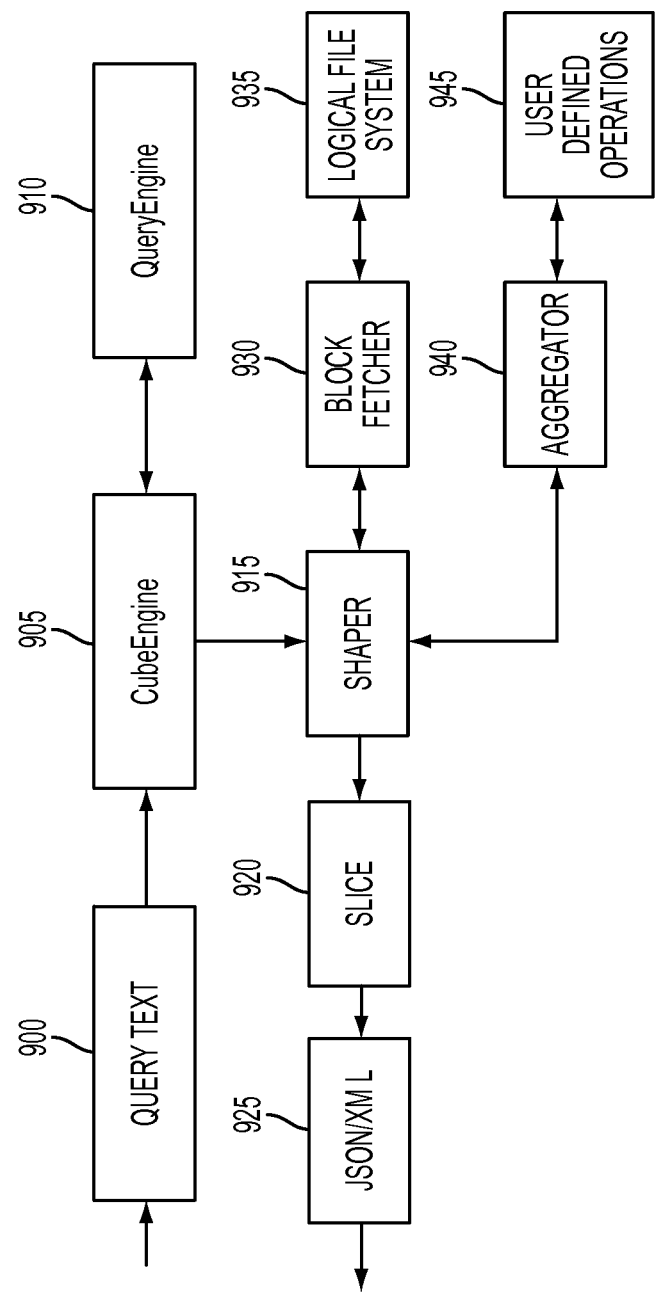
FIG. 9 is a block diagram that illustrates query processing, according to an embodiment.

FIG. 9 illustrates query processing, according to an embodiment. Text of a query request is received at block 900 and input into the cube engine 905 which communicates the query request to the query engine 910. The query engine 910 parses the query request and invokes functions in the cube engine 905.

The cube engine 905 allocates a shaper instance 915 based on the query, data paths, operations, and measures. A block fetcher instance 930 is created based on the fastest path to the data for the query. The shaper 915 communicates with the block fetcher 930 to read data blocks from the logical file system 935 and, using aggregator 940, applies user defined operations 945 to the data blocks read from the logical file system 935. The shaper 915 then uses the output of the aggregator 940 which has processed the data blocks according to the user defined operations 945 to generate a query slice 920. The query slice 920 may be serialized out as text data, binary data, extensible markup language (XML) data, or JavaScript Object Notation (JSON) data 925. The query slice 920 may optionally be merged with other slices.

Figure 10:
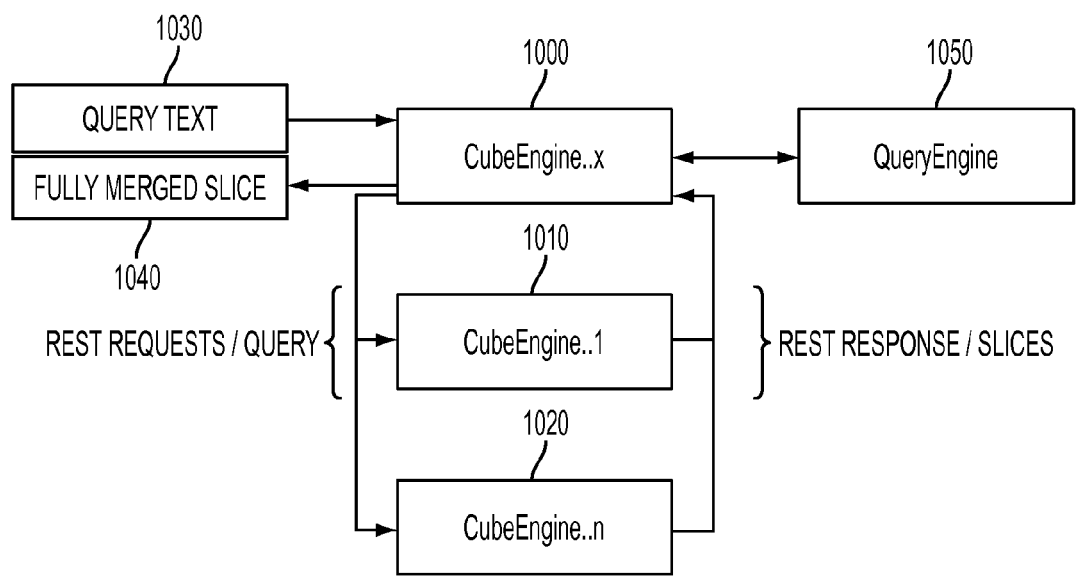
FIG. 10 is a block diagram that illustrates distributed query processing, according to an embodiment.

FIG. 10 illustrates distributed query processing, according to an embodiment. Text of a query request 1030 may be received by cube engine x 1000 among n cube engines 1000, 1010, and 1020. An example of a query request is:

```
execute cube.fn.QueryCube( Catalog='catalog1',
    Schema='schema1', Cube='skyhook1',
    OnColumns='organization_type', Measures='count',
    Operations='cube.op.sum' )
```

Cube engine x 1000 may communicate the query request to the query engine 1050. The query engine 1050 may parse the query request and invoke functions in the cube engine x 1000. Cube engine x 1000 may communicate with a load balancer such as load balancer 100 illustrated in FIG. 1 to distribute processing of the functions invoked by the query engine 1050 parsing the query request among the n cube engines including cube engine x 1000, cube engine 1 1010 and cube engine n 1020. Responses to perform processing of various functions/queries may be communicated between the cube engines 1000, 1010, and 1020 using REST requests. An example of a REST request (query) is:

```
execute cube.fn.QueryCube( Catalog='catalog1',
    Schema='schema1', Cube='skyhook1',
    OnColumns='organization_type', Measures='count',
    Operations='cube.op.sum',
    Directory='<dataPath>/measure/<member1>' )
```

The results of the processing of the REST requests (queries), i.e., query slices returned in response to the REST queries, may be communicated between the cube engines 1000, 1010, and 1020 using REST responses. The query slices may then be merged (mapped/reduced) by cube engine x 1000 and output as a fully merged slice 1040.

Figure 11:
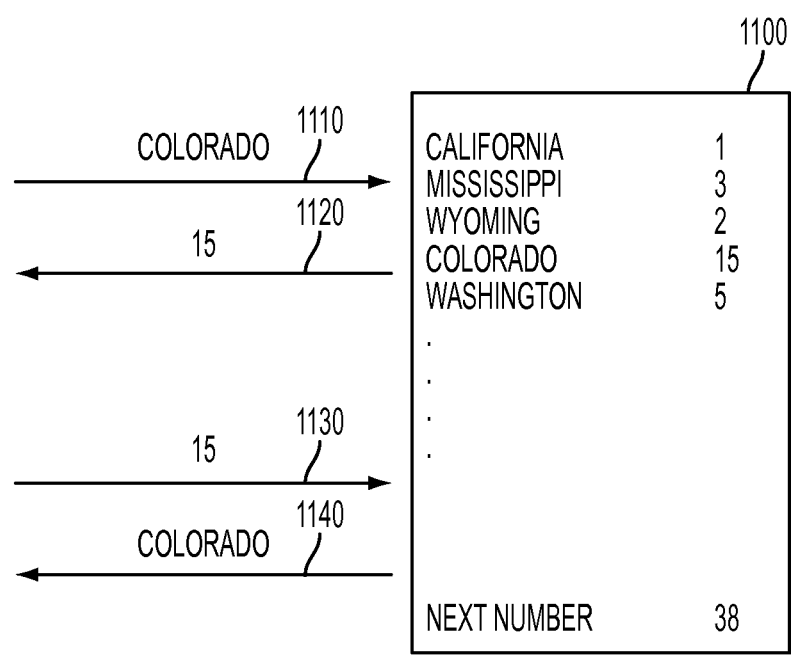
FIG. 11 is a block diagram that illustrates member number (ID) assignment in a cube, according to an embodiment.

Cubes may include member lists which are stored as atomic objects in the object file system (e.g., at " . . . /<cube>/members/<dimension name>/mlist"). FIG. 11 illustrates member number (ID) assignment in a member list 1100 in a cube, according to an embodiment. In the object file system, writers are responsible for updating the member list 1100. ID numbers may be assigned sequentially to new members as they are added to the member list 1100. The member list 1100 is not ordered but is capable of two way mapping. For example, given an ID number 1130 (e.g., 15), the member name 1140 (e.g., "Colorado") may be retrieved. Also, given a member name 1110 (e.g., "Colorado"), the ID number 1120 (e.g., 15) may be retrieved. A member list 1100 may contain the next member ID number to be used (e.g., 38).

Readers may read ID member numbers at the beginning of a query. Readers may optionally cache a member list 1100, which is valid as long as no intervening write transaction occurs.

Figure 12:
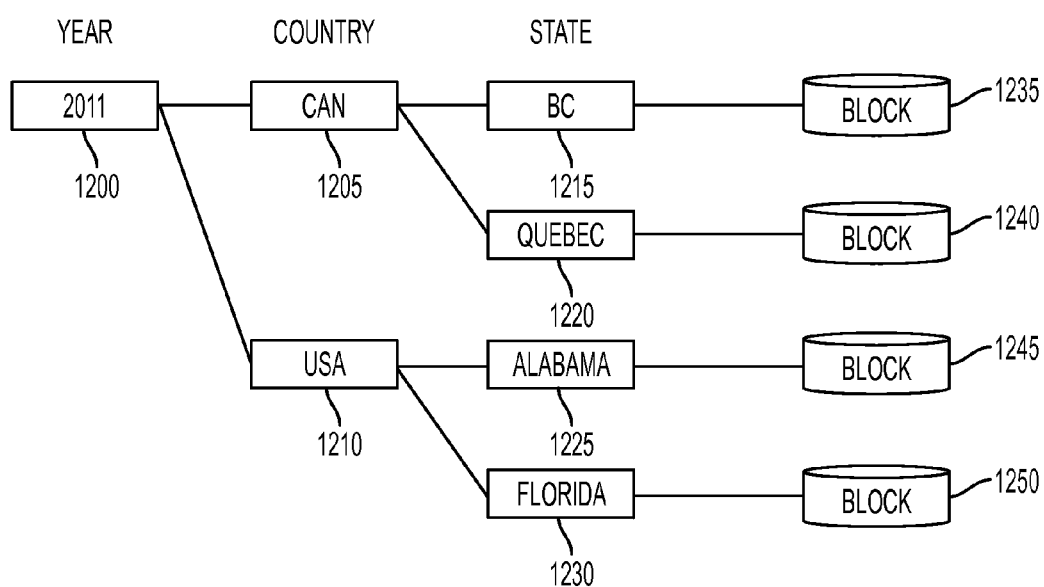
FIG. 12 is a block diagram that illustrates storage paths in a cube, according to an embodiment.

FIG. 12 illustrates storage paths in a cube, according to an embodiment. A cube may contain multiple named storage paths, which resemble directory hierarchies. Each storage path is a subset of dimensions from the cube. The default storage path contains all of the dimensions of the cube. For example, in FIG. 12, "Year," "Country," and "State" are all of the dimensions of the cube, and the default storage path includes all of these dimensions. Storage paths may be described during cube creation and after cube creation. Storage paths may allow cube performance tuning.

Each storage path is a directory path that may include a combination of member values referenced by name (e.g., "Colorado") or ID number (e.g., 15). Data blocks may be stored at inner nodes of the data path and/or leaf directories of the data path. Data blocks may be raw source data, raw measure data, or summary data.

Writers are responsible for creating the directory structure of the data paths as well as storing the data blocks at inner nodes and/or leaf directories of the data path.

Readers traverse the directory structure of a data path and read data blocks stored at inner nodes and/or leaf directories of the data path to satisfy a query. Results of a query may be a combination of directory information and block data. Readers may also merge blocks in the data path.

In the directory structure shown in FIG. 12, the root level includes a node 1200 representing a year (2011). The second level includes nodes representing countries, including node 1205 ("CAN") and node 1210 ("USA"). The third level (leaf level) includes nodes representing states, including node 1215 ("BC"), node 1220 ("Quebec"), node 1225 ("Alabama"), and node 1230 ("Florida"). Data block 1235 is stored at leaf node 1215, data block 1240 is stored at leaf node 1220, data block 1245 is stored at leaf node 1225, and data block 1250 is stored at leaf node 1230.

Various data paths may be defined, such as " . . . /2011/USA/Alabama/block0 . . . blockn", to answer any query over dimensions such as "Year," "Country," and "State." Member values may be referenced by name or by number. For example, " . . . /1/5/3/block0 . . . blockn" may be used in place of " . . . /2011/USA/Alabama/block0 . . . blockn", where 1 corresponds to "2011," 5 corresponds to "USA," and 3 corresponds to "Alabama."

Figure 13:
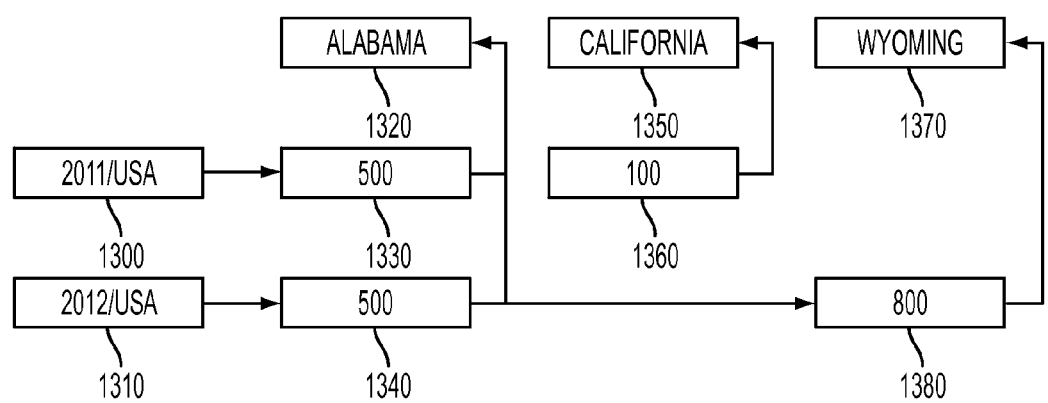
FIG. 13 is a block diagram that illustrates a query slice, according to an embodiment.

FIG. 13 illustrates a query slice, according to an embodiment. A query slice is returned as the result of a query. A query slice may contain rows and columns Each row may include a member path and a list of cells. Each cell may contain computations and a reference to a column. Each column may contain a member path.

In the query slice shown in FIG. 13, the first row includes the member path 1300 ("2011/USA") as well as a list including cells 1330 ("500") and 1360 ("100"). Cell 1330 includes a reference to column 1320 ("Alabama"), and cell 1360 includes a reference to column 1350 ("California"). The second row includes the member path 1310 ("2012/USA") as well as a list including cells 1340 ("500") and 1380 ("800"). Cell 1340 includes a reference to column 1320 ("Alabama"), and cell 1380 includes a reference to column 1370 ("Wyoming").

Figure 14:
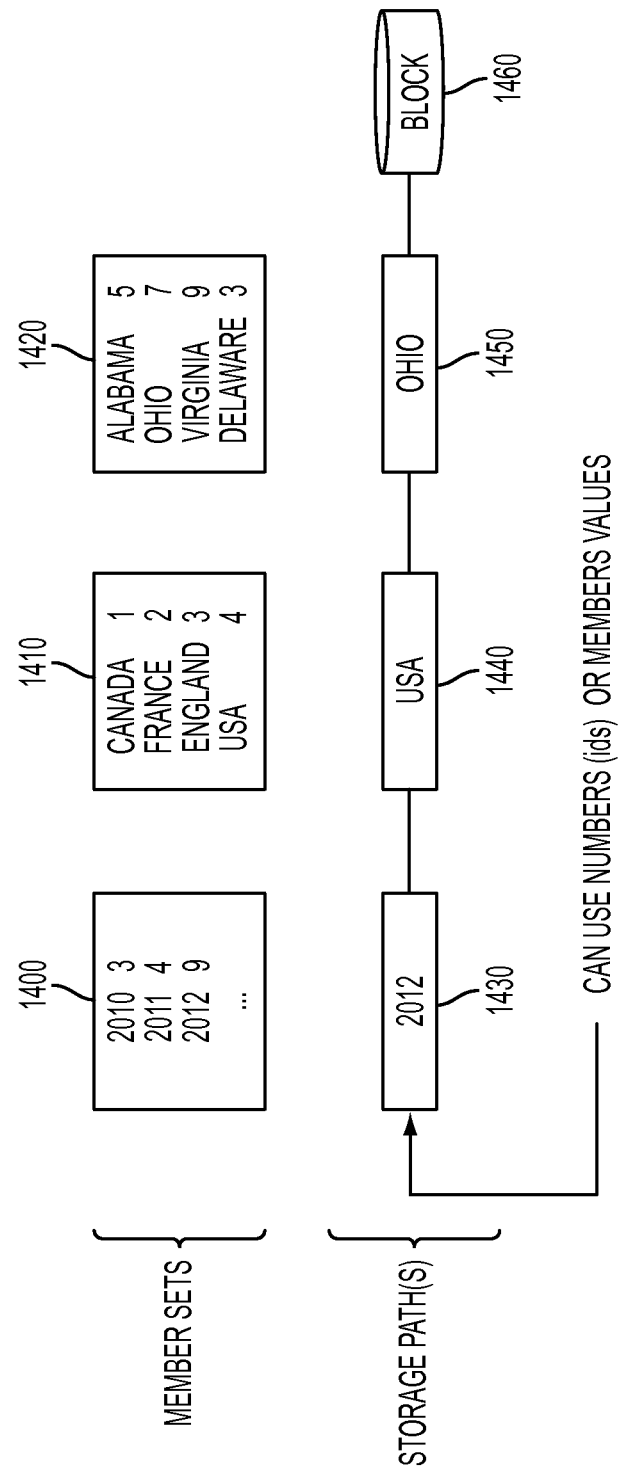
FIG. 14 is a block diagram that illustrates a logical view of a cube, according to an embodiment.

FIG. 14 illustrates a logical view of a cube, according to an embodiment. A cube may include a plurality of member sets 1400, 1410, and 1420, as well as one or more storage paths, such as the path " . . . /2012/USA/Ohio/block" represented by node 1430 ("2012"), node 1440 ("USA"), and leaf node 1450 ("Ohio"). Data blocks such as block 1460 may be stored at leaf nodes such as leaf node 1450, or at internal nodes, such as nodes 1430 and 1440. All information may be stored in the object file system, and most or all of the information may be randomly accessible. Information may be stored as serialized programming objects. Storage paths may be created by traversing other storage paths, and storage paths may either use numbers (member IDs) or member names.

Figure 15:
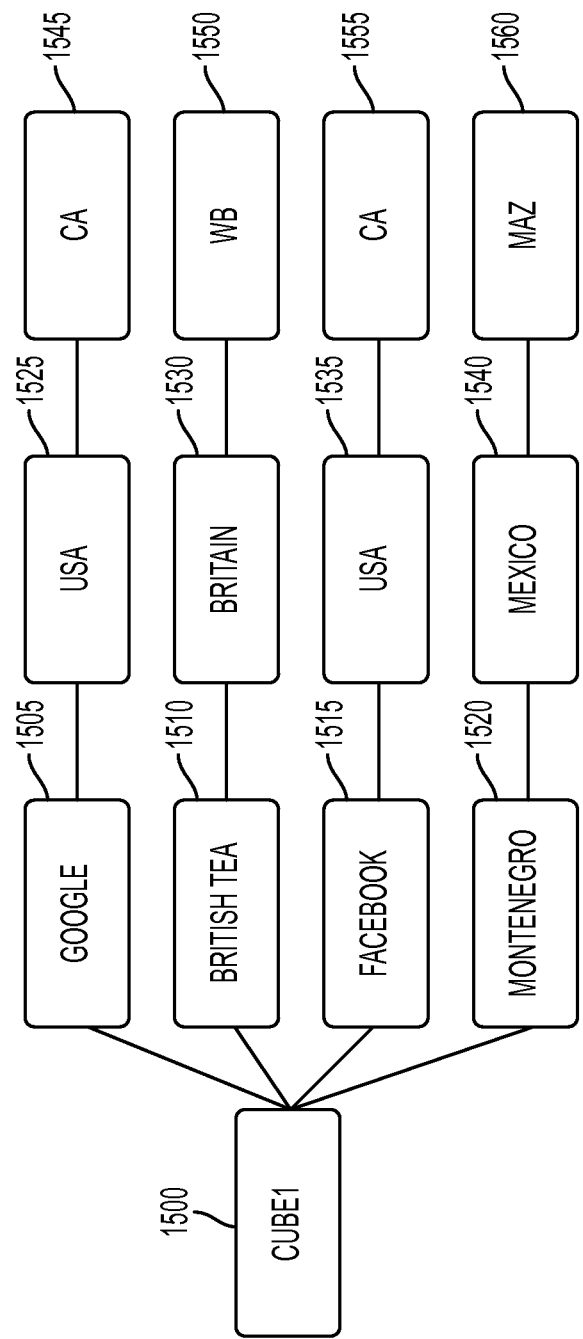
FIG. 15 is a block diagram that illustrates a threaded cube, according to an embodiment.

FIG. 15 illustrates a threaded cube, according to an embodiment. A table or query result set (query slice) may be represented as a tree, with each column in the threaded cube representing level of a tree and the row values representing named nodes at a level corresponding to the column. In the threaded cube, each set of row values describes a path from a root node to a leaf node of the tree. Paths are keys into the key-value store. Measures (values) may be stored at the leaf nodes or as consolidated data inner nodes.

For example, in the threaded cube shown in FIG. 15, the first level of the tree may be represented by a "Customer" column and include node 1505 ("Google™"), node 1510 ("British tea"), node 1515 ("Facebook™"), and node 1520 ("Montenegro"). The second level of the tree may be represented by a "Country" column and include node 1525 ("USA"), node 1530 ("Britain"), node 1535 ("USA"), and node 1540 ("Mexico"). The third level of the tree may be represented by a "State" column and include node 1545 ("CA"), node 1550 ("WB"), node 1555 ("CA"), and node 1560 ("MAZ").

Node addresses may be described as a path. Attributes for each node can then be described in terms of the path. Keys into the key-value store may contain node paths and context information. Paths may be strings. Examples of paths include:

| | |
|---|---|
| Data://Cube1//Google/USA/CA | the raw data |
| Data:sum//Cube1//Google | a consolidated data entry for sum |
| Data://Cube1//Google | a raw data entry for Google |
| Children://Cube1//Facebook | the children of Facebook |
| Parents:///Cube1///USA | the parents of USA at Country level |
| Metadata://Cube1 | the set of metadata for this tree |
| Members://Cube1/// | members of the second level (Britain/Mexico/USA) |
| Data://Cube1//Google/USA/CA/#1 | raw data for block |

Tree Threading

For efficient movement through the tree, backward threading may be provided. Backward threading allows for data shaping and high performance when filtering. The key "Parents://Cube1///USA" may contain all of the parent names for the second level node whose value is USA. If there is ever a filter of the term "USA" for the second level of the tree, then this information makes is easy to construct the absolute paths.

For example, if a query specifies taking the sum for "Customer" and "Country" where Country="USA," then all absolute paths may be found from the "Customer" path that meets the criteria at the "Country" level. By having parents quickly accessible for nodes, key expansion may be much faster and more efficient.

Tree threading may also make monitoring and debugging easier because one of the discreet steps of query processing is to expand all query specifics into a complete list of key paths before attempting any data access. The expansion of key paths may be distributed but the fundamental design favors generating key closures over data access. Key closures are simply string manipulation and are much faster than data access.

Shaping

The result set shape may be determined by which dimensions are grouped on rows or columns, where the cell intersections represents the operations on the measures. The number of rows and columns depicting the shape may be dependent on the content of the dimensional member intersections. Certain types of dimensions may need to be exploded into the shape of the result by filling in missing members of actual input data. For example, if a dimension of the cube is a day and the input data does not contain data for a particular day, the result set may still need to show a shaped entry for the missing day with the cells for that intersection nulled or zeroed.

Generally, the number of dimensions on rows and columns in the result shape linearly affects cube performance. Shaping is a simple grouping algorithm that may be very fast and easily distributable. For example, the following is a shape with "Country" and "State" on the rows, and the column names are "Country," "State," and "Sum."

| Country | State | Sum |
|---|---|---|
| Britain | WB | 15 |
| Mexico | MAZ | 20 |
| USA | CA | 15 |

The following is a shape with "Country" on rows and "State" on columns, with the sum being the intersection:

| Country | CA | MAZ | WB |
|---|---|---|---|
| Britain | | | 15 |
| Mexico | | 20 | |
| USA | 15 | | |

The following is shaped with "Country" and "Customer" on columns:

| Britain | Mexico | USA | |
|---|---|---|---|
| British Tea | Montenegro | Google | Facebook |
| 15 | 20 | 5 | 10 |

The following is shaped with "Country" and "Customer" on columns:

| Country | Customer | Sum |
|---|---|---|
| Britain | British Tea | 15 |
| Mexico | Montenegro | 20 |
| USA | | 20 |
| | Google | 5 |
| | Facebook | 10 |

Operators and Querying

Various operators such as sum, average, min, and max may be defined in the metadata and implemented by dynamically loaded classes. Additional operators may be created and dropped into the class path. Querying and other operations may be achieved through language syntax or stored procedure invocation.

For a multi-dimensional query, the following information may be specified: (1) the cube to be queried, (2) the measures to operate on and display, (3) how the result set is shaped, including which dimensions are on rows and which dimensions are on columns, (4) what are the dimensional filters, and (5) the format of the result.

EXAMPLES

```
execute ce.Query( Cube='Cube1' , Measures='Queries' );
    default rows is empty
    default columns is empty
    default operator is Sum
```

```
    default format is JSON
    Measures are be specified.
This will return a single row with a single column called "Sum"
which returns the grand total of all data in the cube.
    execute ce.Query( Cube='Cube1', Rows={'Customer'},
    Operators='Sum' );
```

This will return a data set that has customers listed on the left.

```
    execute ce.Query( Cube='Cube1', Rows={'Country'},
    Columns={'State'} );
    execute ce.Query( Cube='Cube1', Rows={'State', 'Customer'},
Country='USA');
    execute ce.Query( Cube='Cube1', Customer={'Google',
    'Facebook'} );
    execute ce.Query( Cube='Cube1',
        Expression='Customer like "G%" or State = "CA"' );
    execute ce.Query( Cube='Cube1', Paths={'/Google', '//
    Mexico'} );
        execute ce.Query( Cube='Cube1', Paths={'/Google',
        '//Mexico'} );
```

The level of recursive operations over the operations such as sum, average, min, and max is unlimited. The recursive nature of operations is how distribution and scalability is achieved.

Query processing may be performed as follows. The incoming request may be parsed. Operators classes may be loaded, and an instance may be created. Ranges or filters may be determined Query paths may be expanded. The query paths may include block addresses or ranges of block addresses. Data location and availability may be determined before distributing a query to a cluster. New sub-queries with specific filters and/or paths may be created. An intersection set of rows and columns may be created. Segmented sub-queries may be sent to nodes in the cluster. For example, queries may be sent directly to the node that contains keys used in the query. The data or consolidated data may be gathered and fed to the operators. Finally, results are returned from the query processing.

Metadata

Metadata may contain information about cubes, dimensions and measures, subtotals and other calculations, important tree branches, what parts of the tree to keep in memory, what parts to preload, definitions and other information about creation, and source data.

Query Distribution/Scaling

Each node in the cluster is running identical cube software and stores a list of other nodes in the cluster locally. Each node in the cluster may run an instance of a key-value store such as Apache Cassandra. Each node may be load balanced on the incoming HTTP port.

According to an embodiment, the way the data is stored either at the leaf or as consolidated data is compatible, and thus an operator does not know if the data has come from a leaf node or an internal node. An operator instance may indicate if it can produce and consume consolidated data.

Raw Data Vs. Consolidated Data

At each node, there may be either raw data or consolidated data. Consolidated data is data that has been processed by an operator and may be reprocessed with no loss of correctness at that node. Consolidated data is data produced by an operator that may be serialized, stored, and retrieved later to be fed back to that same operator to get faster results.

For example, a cube may have been created with 10 levels and 2 measures and performance for operations over a sum are not within the performance window for certain paths. Consolidated data may be added at different levels of the cube and for certain paths to increase the performance along certain query paths for certain operators.

The definition of consolidated data computation may be done at cube creation or after the cube has been created. According to an embodiment, as a default, consolidated data computation may be performed every 3 levels.

Compression

Data blocks that represent the fully granular measures may be compressed using standard block compression techniques. Compression ratios of 50% may be achieved because of the numeric content of those blocks. According to an embodiment, consolidated data is not compressed because it is very small.

Paths (keys) may also be compressed easily. For example, each member value of the path may be replaced by the member ID assigned to the member value during insertion. Filters and other query representations may be exploded accordingly depending on whether member IDs are assigned in sorted order. This may reduce disk storage and memory footprint but also makes the keys more opaque. For example, "//Cube1/Google/USA/CA" may become "//1/3/4/1" during the insertion process.

Other techniques to compress the path that provide higher compression may be used, such as a hash function that creates collision-less hash codes. For example, "//Cube1/Google/USA/CA" may become "1-38372639," which is then used as a reverse index into the source key.

Figure 16:
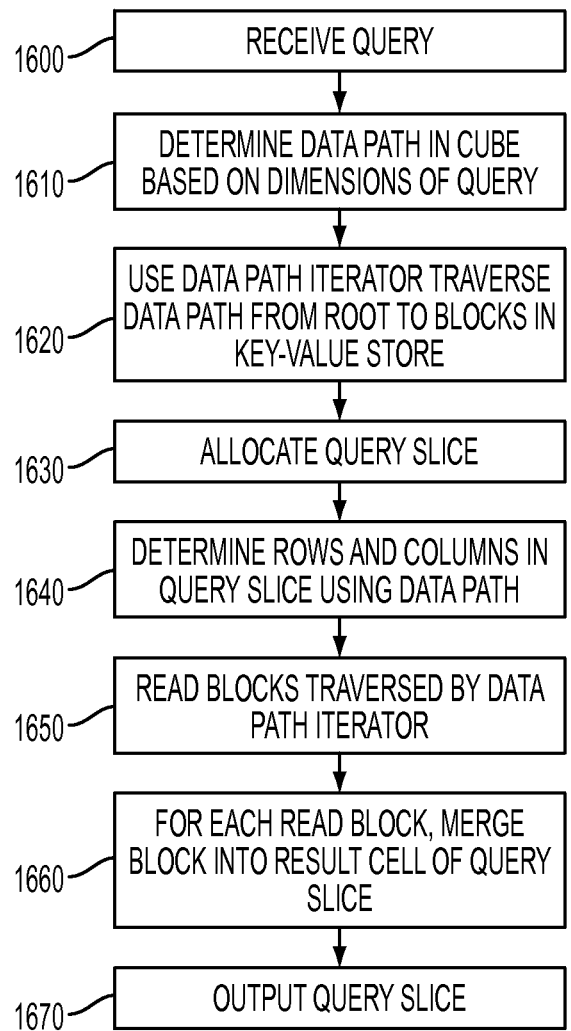
FIG. 16 is a flow diagram that illustrates a method for processing a query using a cube engine, according to an embodiment.

FIG. 16 is a flow diagram that illustrates a method for processing a query using a cube engine, according to an embodiment. A query is received in block 1600, and a data path in the cube is determined based on the dimensions of the query in block 1610. A data path iterator is used to traverse the data path from the root to blocks in the key-value store in block 1620. A query slice is allocated in block 1630, and rows and columns in the query slice are determined using the data path in block 1640. Data blocks traversed by the data path iterator are read in block 1650, and in block 1660, for each data block that is read, the read data block is merged into the result cell of the query slice. In block 1670, the query slice is output.

Figure 17:
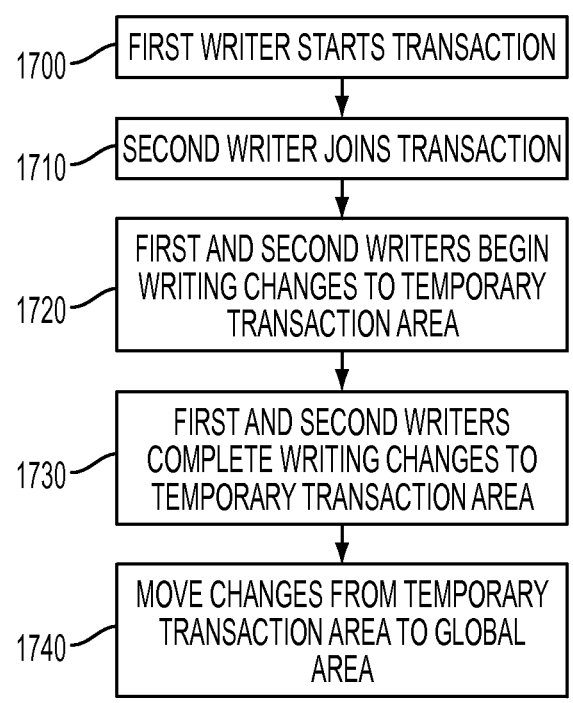
FIG. 17 is a flow diagram that illustrates a process for performing a transactional update of a plurality of values in a key-value store, according to an embodiment.

FIG. 17 is a flow diagram that illustrates a process for performing a transactional update of a plurality of values in a key-value store, according to an embodiment. A write transaction commences when a first writer starts the write transaction in block 1700. A second writer may join the write transaction in block 1710. The first writer and the second writer begin writing changes to a temporary transaction area in block 1720. The temporary transaction area may be located in volatile memory such as random access memory (RAM), or in a non-volatile storage area such as a hard disk drive (HDD), solid state drive (SSD), flash memory, or any other type of memory or storage device. In block 1730, the first writer and the second writer complete writing changes to the temporary transaction area. In block 1740, the changes written to the temporary transaction area are moved to the global transaction area.

Figure 18:
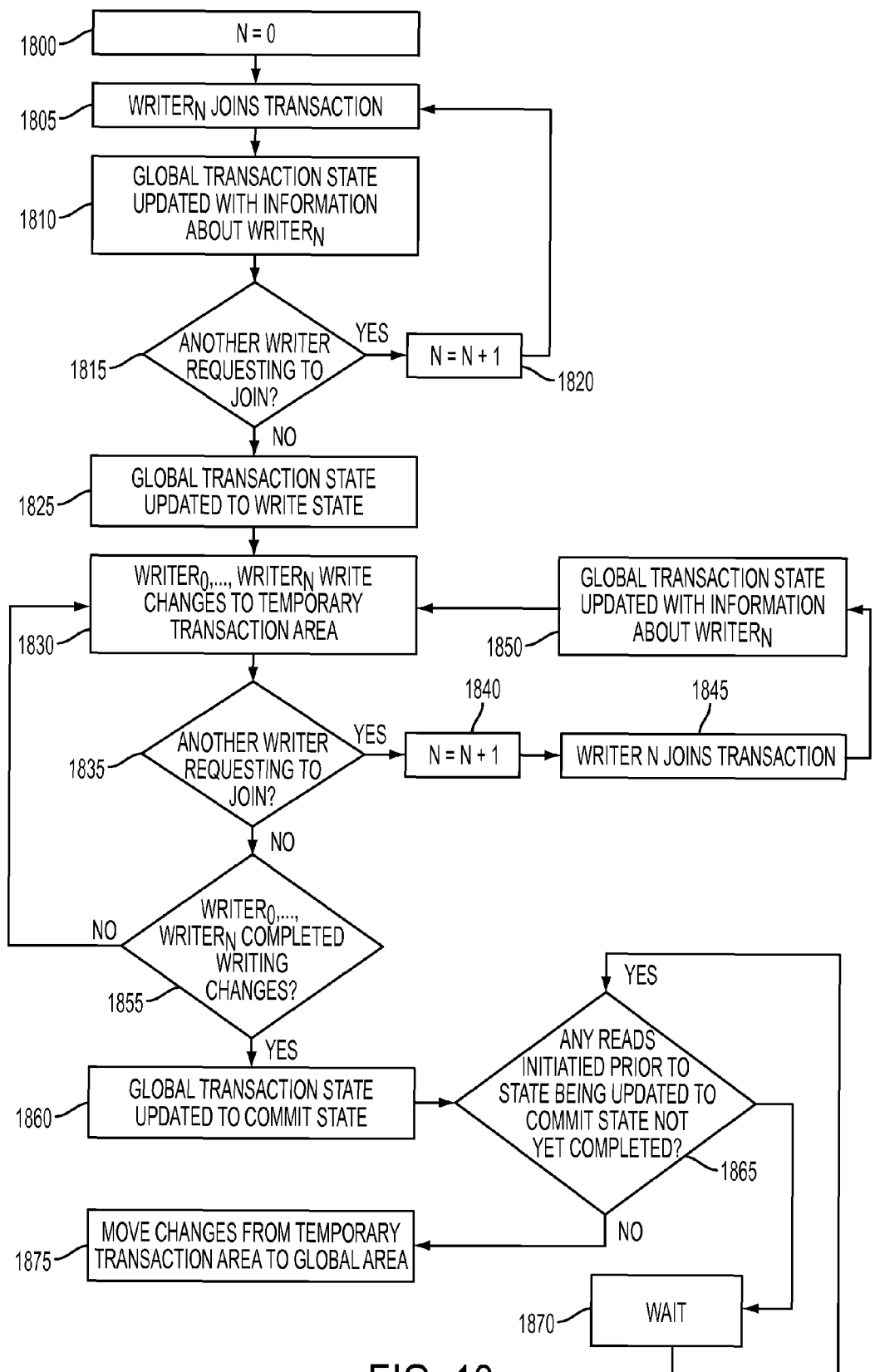
FIG. 18 is a flow diagram that illustrates a process for performing a transactional update of a plurality of values in a key-value store, according to an embodiment.

The process for performing a transactional update of a plurality of values in a key-value store is illustrated in greater detail in FIG. 18. In block 1800, a write transaction commences and n is set to 0. In block 1805, writer$_n$ joins the write transaction, and in block 1810, the global transaction state is updated with information about writer$_n$. In block 1815, a determination is made as to whether or not another writer is requesting to join the write transaction. If another writer is requesting to join the write transaction, flow proceeds to block 1820, and n is incremented by one. Flow then returns to block 1805 and $writer_n$ joins the write transaction.

If in block 1815 a determination is made that another writer is not requesting to join the write transaction, flow proceeds to block 1825, and the global transaction state is updated to a write state. In block 1830, each of the writers ($writer_0$ through $writer_n$) writes changes to the temporary transaction area. In block 1835, a determination is made as to whether or not another writer is requesting to join the write transaction. If another writer is requesting to join the write transaction, flow proceeds to block 1840, and n is incremented by one. Flow then proceeds to block 1845, in which $writer_n$ joins the transaction, and then returns to block 1830, in which each of the writers ($writer_0$ through $writer_n$) writes changes to the temporary transaction area.

If in block 1835 a determination is made that another writer is not requesting to join the write transaction, flow proceeds to block 1855, and a determination is made as to whether or not all of the writers ($writer_0$ through $writer_n$) have completed writing changes to the temporary transaction area. If a determination is made in block 1855 that not all of the writers ($writer_0$ through $writer_n$) have completed writing changes to the temporary transaction area, then flow returns to block 1830, and each of the writers ($writer_0$ through $writer_n$) writes changes to the temporary transaction area.

If in block 1855 a determination is made that all of the writers ($writer_0$ through $writer_n$) have completed writing changes to the temporary transaction area, then flow proceeds to block 1860 and the global transaction state is updated to a commit state. In block 1865, a determination is made as to whether or not there are any reads that are not yet completed that were initiated prior to the global transaction state being updated to the commit state. If a determination is made that there are reads that are not yet completed that were initiated prior to the global transaction state being updated to the commit state, flow proceeds to block 1870 in which the process waits for a predetermined period of time, and then flow returns to block 1865 in which a determination is made as to whether or not there are any reads that are not yet completed that were initiated prior to the global transaction state being updated to the commit state.

If in block 1865 a determination is made that there are not any reads that are not yet completed that were initiated prior to the global transaction state being updated to the commit state, then flow proceeds to block 1875 and changes are moved from the temporary transaction area to the global area. Any or all of the writers ($writer_0$ through $writer_n$) may move any or all of the changes from the temporary transaction area to the global area; a writer is not restricted to moving only the values it changed.

Figure 19:
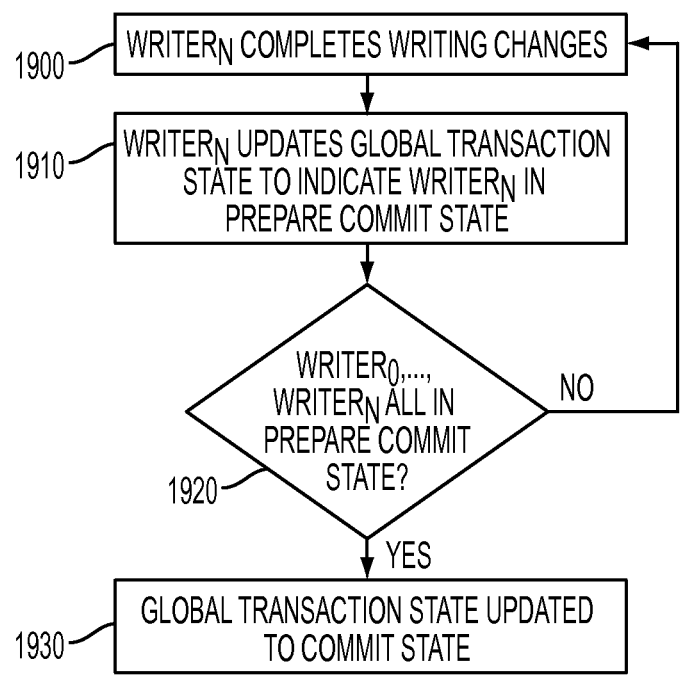
FIG. 19 is a flow diagram that illustrates a process for updating the global transaction state to a commit state, according to an embodiment.

FIG. 19 is a flow diagram that illustrates a process for updating the global transaction state to a commit state, according to an embodiment. In block 1900, $writer_n$ completes writing changes to the temporary transaction area, and in block 1910, $writer_n$ updates the global transaction state to store information indicating that $writer_n$ is in a prepare commit state. In block 1920, a determination is made as to whether or not all of the writers ($writer_0$ through $writer_n$) are in the prepare commit state, based on the information stored in the global transaction state. If a determination is made that not all of the writers are in the prepare commit state, flow returns to block 1900 in which $writer_n$ completes writing changes to the temporary transaction area.

If in block 1920 a determination is made that all of the writers are in the prepare commit state, flow proceeds to block 1930, and the global transaction state is updated to the commit state.

Figure 20:
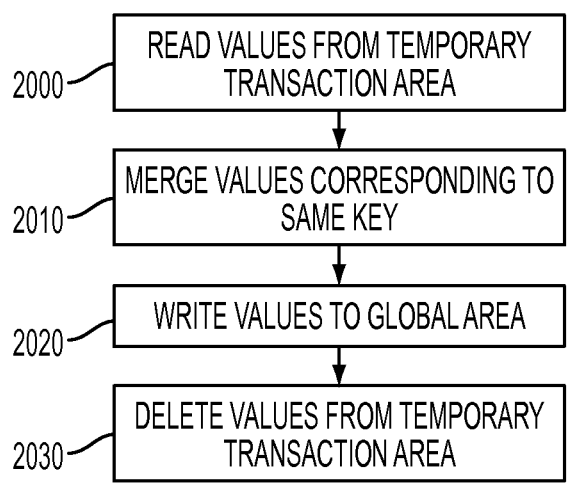
FIG. 20 is a flow diagram that illustrates a process for moving changes from a temporary transaction area to a global area in the key-value store, according to an embodiment.

FIG. 20 is a flow diagram that illustrates a process for moving changes from a temporary transaction area to a global area in the key-value store, according to an embodiment. In block 2000, values are read from the temporary transaction area. In block 2010, when multiple values exist that correspond to the same key, the multiple values for the key are merged. In block 2020, the values are written to the global area in the key-value store. In block 2030, the values are deleted from the temporary transaction area.

Figure 21:
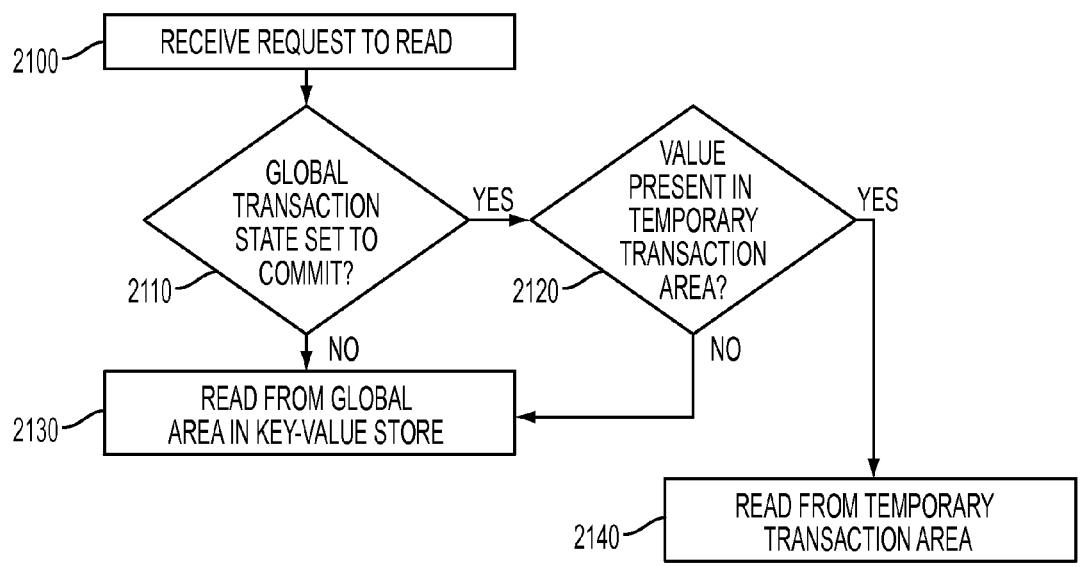
FIG. 21 is a flow diagram that illustrates a process for performing a read in a key-value store, according to an embodiment.

FIG. 21 is a flow diagram that illustrates a process for performing a read in a key-value store, according to an embodiment. In block 2100, a request to read values in the key-value store is received. In block 2110, a determination is made as to whether or not the global transaction state is set to a commit state. If a determination is made that the global transaction state is not set to the commit state, flow proceeds to block 2130, and values are read from the global area in the key-value store.

If in block 2110 a determination is made that the global transaction state is set to the commit state, flow proceeds to block 2120, and a determination is made as to whether or not the value to be read is present in the temporary transaction area. If a determination is made that the value to be read is present in the temporary transaction area, flow proceeds to block 2140 and the value is read from the temporary transaction area. If in block 2120 a determination is made that the value to be read is not present in the temporary transaction area, flow proceeds to block 2130 and the value is read from the global area in the key-value store.

Figure 22:
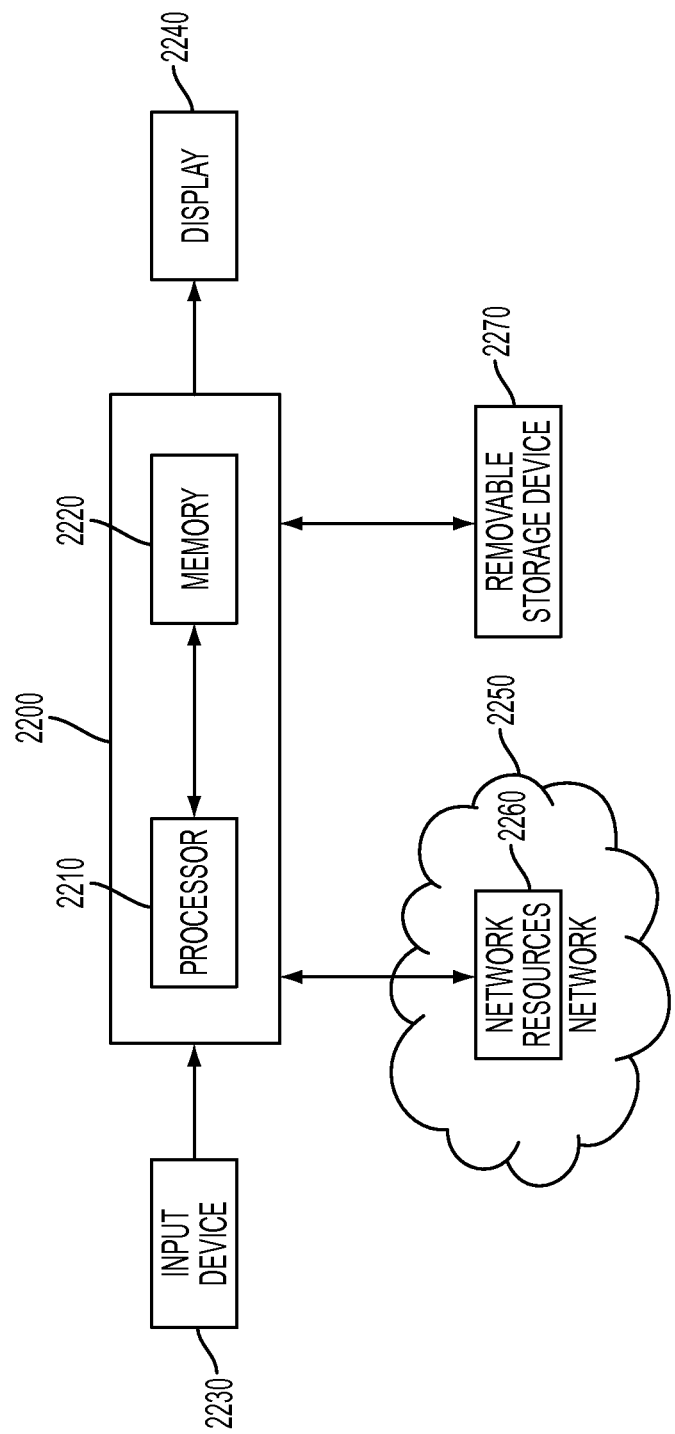
FIG. 22 is a block diagram illustrating a computer system upon which the system may be implemented, according to an embodiment.

FIG. 22 is a block diagram that illustrates an embodiment of a computer/server system 2200 upon which an embodiment may be implemented. The computer/server system 2200 includes a processor 2210 and memory 2220 which operate to execute instructions, as known to one of skill in the art. The term "computer-readable storage medium" as used herein refers to any tangible medium, such as a disk or semiconductor memory, that participates in providing instructions to processor 2210 for execution. Additionally, the computer/server system 2200 receives input from a plurality of input devices 2230, such as a keyboard, mouse, touch device, touchscreen, or microphone. The computer/server system 2200 may additionally be connected to a removable storage device 2270, such as a portable hard drive, optical media (CD or DVD), disk media, or any other tangible medium from which a computer can read executable code. The computer/server system 2200 may further be connected to network resources 2260 which connect to the Internet or other components of a local public or private network 2250. The network resources 2260 may provide instructions and data to the computer/server system 2200 from a remote location on a network 2250 such as a local area network (LAN), a wide area network (WAN), or the Internet. The connections to the network resources 2260 may be via wireless protocols, such as the 802.11 standards, Bluetooth® or cellular protocols, or via physical transmission media, such as cables or fiber optics. The network resources 2260 may include storage devices for storing data and executable instructions at a location separate from the computer/server system 2200. The computer/server system 2200 may interact with a display 2240 to output data and other information to a user, as well as to request additional instructions and input from the user. The display 2240 may be a touchscreen display and may act as an input device 2230 for interacting with a user.

Figure 23:
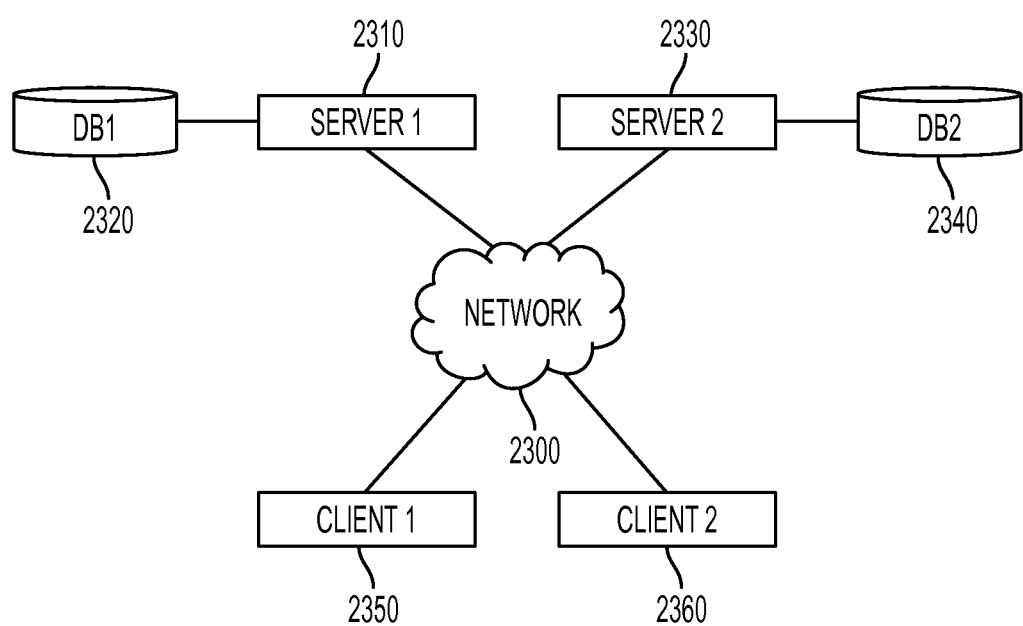
FIG. 23 is a block diagram illustrating a network including servers upon which the system may be implemented and client machines that communicate with the servers, according to an embodiment.

FIG. 23 is a block diagram that illustrates an embodiment of a network 2300 including servers 2310 and 2330 upon which the system may be implemented and client machines 2350 and 2360 that communicate with the servers 2310 and 2330. The client machines 2350 and 2360 communicate across the Internet or another WAN or LAN 2300 with server 1 2310 and server 2 2330. Server 1 2310 communicates with database 1 2320, and server 2 2330 communicates with database 2 2340. According to an embodiment, server 1 2310 and server 2 2330 may implement cube engines, a load balancer, and/or a key-value store. Client 1 2350 and client 2 2360 may send queries to the cube engines implemented on server 1 2310 and server 2 2330 for execution. Server 1 2310 may communicate with database 1 2320 in the process of executing a search query at the request of a client, and server 2 2330 may communicate with database 2 2340 in the process of processing a query at the request of a client.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A computer implemented method including a processor circuitry configured for performing a transactional update of a plurality of values in a key-value store, the method comprising:
    a first writer starting a transaction that includes updating, in a temporary transaction area, the plurality of values with a first set of changes;
    a second writer joining the transaction and updating, in the temporary transaction area, the plurality of values with a second set of changes;
    upon determining that the first set of changes and the second set of changes include respective first and second sets of multiple values associated with a pre-existing key in the key-value store, merging the multiple values from each of the sets of changes and updating the plurality of values with the merged value; and
    upon determining that the first writer and the second writer have completed writing the sets of changes, moving the plurality of values from the temporary transaction area to a global area in the key-value store; maintaining a global transaction state that is periodically updated by the first writer and the second writer; adding information about the first writer and the second writer to the global transaction state; before the first writer and the second writer start updating the plurality of values, updating the global transaction state to a write state; and after the first writer and the second writer complete updating the plurality of values, updating the global transaction state to a commit state.

2. The method according to claim 1, wherein additional writers are permitted to join the transaction before the global transaction state is updated to the commit state.

3. The method according to claim 1, wherein each of the writers, upon completion of updating the plurality of values, updates the global transaction state to indicate the completion of updating the plurality of values, and
    wherein once the global transaction state indicates each of the writers have completed updating the plurality of values, the global transaction state is updated to the commit state and the moving the plurality of values from the temporary transaction area to the global area in the key-value store is performed.

4. The method according to claim 1, further comprising:
    after the first writer completes updating the plurality of values, updating the global transaction state to indicate that the first writer has entered a prepare commit state and is waiting for the second writer to enter the prepare commit state;
    after the second writer completes updating the plurality of values, updating the global transaction state to indicate that the second writer has entered a prepare commit state and is waiting for the first writer to enter the prepare commit state;
    after the first writer and the second writer are in the prepare commit state as indicated by the global transaction state, the updating the global transaction state to the commit state and the moving the plurality of values from the temporary transaction area to a global area in the key-value store are performed.

5. The method according to claim 1, wherein the moving the plurality of values from the temporary transaction area to the global area in the key-value store comprises:
    reading the plurality of values from the temporary transaction area;
    writing the plurality of values read from the temporary transaction area to the global area in the key-value store; and
    deleting the plurality of values from the temporary transaction area.

6. The method according to claim 3, wherein a reader reads from the global area in the key-value store except when the global transaction state is set to the commit state, during which the reader first reads from the temporary transaction area and then, if a value to be read does not exist in the temporary transaction area, reads from the global area in the key-value store.

7. The method according to claim 6, wherein when the reader initiates a read prior to the updating the global transaction state to the commit state and the read is not completed at a time when the updating the global transaction state to the commit state is performed, the writers delay writing the changes until the reader completes the read.

8. A non-transitory computer readable medium storing a program causing a computer to execute a method for performing a transactional update of a plurality of values in a key-value store, the method comprising:
    a first writer starting a transaction that includes updating, in a temporary transaction area, the plurality of values with a first set of changes;
    a second writer joining the transaction and updating, in the temporary transaction area, the plurality of values with a second set of changes;

upon determining that the first set of changes and the second set of changes include respective first and second sets of multiple values associated with a pre-existing key in the key-value store, merging the multiple values from each of the sets of changes and updating the plurality of values with the merged value; and upon determining that the first writer and the second writer have completed writing the sets of changes, moving the plurality of values from the temporary transaction area to a global area in the key-value store; maintaining a global transaction state that is periodically updated by the first writer and the second writer; adding information about the first writer and the second writer to the global transaction state; before the first writer and the second writer start updating the plurality of values, updating the global transaction state to a write state; and after the first writer and the second writer complete updating the plurality of values, updating the global transaction state to a commit state.

9. The non-transitory computer readable medium according to claim 8, wherein additional writers are permitted to join the transaction before the global transaction state is updated to the commit state.

10. The non-transitory computer readable medium according to claim 8, wherein each of the writers, upon completion of updating the plurality of values, updates the global transaction state to indicate the completion of updating the plurality of values, and wherein once the global transaction state indicates each of the writers have completed updating the plurality of values, the global transaction state is updated to the commit state and the moving the plurality of values from the temporary transaction area to the global area in the key-value store is performed.

11. The non-transitory computer readable medium according to claim 8, further comprising:

after the first writer completes updating the plurality of values, updating the global transaction state to indicate that the first writer has entered a prepare commit state and is waiting for the second writer to enter the prepare commit state;

after the second writer completes updating the plurality of values, updating the global transaction state to indicate that the second writer has entered a prepare commit state and is waiting for the first writer to enter the prepare commit state;

after the first writer and the second writer are in the prepare commit state as indicated by the global transaction state, the updating the global transaction state to the commit state and the moving the plurality of values from the temporary transaction area to a global area in the key-value store are performed.

12. The non-transitory computer readable medium according to claim 8, wherein the moving the plurality of values from the temporary transaction area to the global area in the key-value store comprises:

reading the plurality of values from the temporary transaction area;

writing the plurality of values read from the temporary transaction area to the global area in the key-value store; and deleting the plurality of values from the temporary transaction area.

13. The non-transitory computer readable medium according to claim 10, wherein a reader reads from the global area in the key-value store except when the global transaction state is set to the commit state, during which the reader first reads from the temporary transaction area and then, if a value to be read does not exist in the temporary transaction area, reads from the global area in the key-value store.

14. The non-transitory computer readable medium according to claim 13, wherein when the reader initiates a read prior to the updating the global transaction state to the commit state and the read is not completed at a time when the updating the global transaction state to the commit state is performed, the writers delay writing the changes until the reader completes the read.

15. A system for performing a transactional update of a plurality of values in a key-value store, the system comprising:

a processor circuitry;

a key-value store;

a first writer unit that starts a transaction that includes updating, in a temporary transaction area, the plurality of values with a first set of changes; and a second writer unit that joins the transaction and updates, in the temporary transaction area, the plurality of values with a second set of changes, wherein upon determining that the first set of changes and the second set of changes include respective first and second sets multiple values associated with a pre-existing key in the key-value store, merging the multiple values from each of the sets of changes and updating the plurality of values with the merged value; and wherein upon determining that the first writer unit and the second writer unit have completed writing the sets of changes, moving the plurality of values from the temporary transaction area to a global area in the key-value store wherein: the first writer unit and the second writer unit periodically update a global transaction state; the first writer unit and the second writer unit add information about the first writer unit and the second writer unit to the global transaction state; before the first writer unit and the second writer unit start updating the plurality of values, the global transaction state is updated to a write state; and after the first writer unit and the second writer unit complete updating the plurality of values, the global transaction state is updated to a commit state.

16. The system according to claim 15, further comprising additional writer units that join the transaction before the global transaction state is updated to the commit state.

17. The system according to claim 15, wherein each of the writer units, upon completion of updating the plurality of values, updates the global transaction state to indicate the completion of updating the plurality of values, and wherein once the global transaction state indicates each of the writer units have completed updating the plurality of values, the global transaction state is updated to the commit state and the plurality of values are moved from the temporary transaction area to the global area in the key-value store.

18. The system according to claim 15, wherein:

the first writer unit, after completing updating the plurality of values, updates the global transaction state to indicate that the first writer unit has entered a prepare commit state and is waiting for the second writer unit to enter the prepare commit state;

the second writer unit, after completing updating the plurality of values, updates the global transaction state to indicate that the second writer unit has entered a prepare commit state and is waiting for the first writer unit to enter the prepare commit state;

after the first writer unit and the second writer unit are in the prepare commit state as indicated by the global transaction state, the global transaction state is updated to the commit state the plurality of values are moved from the temporary transaction area to a global area in the key-value store.

19. The system according to claim 15, wherein the first writer unit and the second writer unit move the plurality of values from the temporary transaction area to the global area in the key-value store by reading the plurality of values from the temporary transaction area, writing the plurality of values read from the temporary transaction area to the global area in the key-value store, and deleting the plurality of values from the temporary transaction area.

20. The system according to claim 17, further comprising a reader unit that reads from the global area in the key-value store except when the global transaction state is set to the commit state, during which the reader unit first reads from the temporary transaction area and then, if a value to be read does not exist in the temporary transaction area, reads from the global area in the key-value store.

21. The system according to claim 20, wherein when the reader unit initiates a read prior to the updating the global transaction state to the commit state and the read is not completed at a time when the updating the global transaction state to the commit state is performed, the writers units delay writing the changes until the reader completes the read.

* * * * *